(12) United States Patent
Tanaka

(10) Patent No.: US 9,039,190 B2
(45) Date of Patent: May 26, 2015

(54) PROJECTOR HAVING INTEGRATOR WITH GREATER ILLUMINANCE IN OFFSET DIRECTION OF PROJECTION LENS AND MODULATOR

(71) Applicant: SEIKO EPSON CORPORATION, Tokyo (JP)

(72) Inventor: Katsumi Tanaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 105 days.

(21) Appl. No.: 13/853,528

(22) Filed: Mar. 29, 2013

(65) Prior Publication Data
US 2013/0271735 A1   Oct. 17, 2013

(30) Foreign Application Priority Data

Apr. 12, 2012 (JP) ................. 2012-090849

(51) Int. Cl.
G03B 21/20 (2006.01)
H04N 9/31 (2006.01)
G03B 21/14 (2006.01)
G03B 33/12 (2006.01)

(52) U.S. Cl.
CPC ............ G03B 21/208 (2013.01); H04N 9/3152 (2013.01); *H04N 9/317* (2013.01); G03B 21/142 (2013.01); *G03B 33/12* (2013.01)

(58) Field of Classification Search
CPC .... G03B 21/00; G03B 21/006; G03B 21/008; G03B 21/14; G03B 21/142; G03B 21/02; G03B 21/208; G03B 21/2093; H04N 9/31; H04N 9/3152; H04N 9/317

USPC .......... 353/30–31, 33–34, 37–38, 48–49, 82, 353/94, 101; 359/648–651
See application file for complete search history.

(56) References Cited

U.S. PATENT DOCUMENTS

| | | | |
|---|---|---|---|
| 5,865,521 A | 2/1999 | Hashizume et al. | |
| 6,000,802 A | 12/1999 | Hashizume et al. | |
| 6,142,634 A | 11/2000 | Ogawa et al. | |
| 6,247,817 B1 | 6/2001 | Ogawa et al. | |
| RE38,084 E | 4/2003 | Hashizume et al. | |
| 6,607,276 B1 * | 8/2003 | Akiyama | 353/38 |
| 6,877,882 B1 * | 4/2005 | Haven et al. | 362/308 |
| 6,935,753 B2 * | 8/2005 | Takezawa et al. | 353/119 |
| RE39,040 E | 3/2006 | Ogawa et al. | |

(Continued)

FOREIGN PATENT DOCUMENTS

JP   A-10-115803   5/1998

*Primary Examiner* — Jori S Reilly-Diakun
(74) *Attorney, Agent, or Firm* — Oliff PLC

(57) ABSTRACT

A projector including a light source unit, a lens integrator system, a light modulator having an image formation region where light from the lens integrator system is modulated in accordance with image information, and a projection system that projects light from the light modulator, wherein the projection system is so disposed that the optical axis of the light incident on the projection system is shifted from the optical axis of the projection system in a predetermined direction when the projection system is viewed in the direction in which the light travels toward the projection system, and the lens integrator system is so configured that illuminance of the light on a first side corresponding to the predetermined direction in the image formation region is higher than illuminance of the light on a second side that is opposite the first side.

8 Claims, 6 Drawing Sheets

(56) References Cited

U.S. PATENT DOCUMENTS

| | | | |
|---|---|---|---|
| 7,125,144 B2* | 10/2006 | Shimaoka et al. | 362/243 |
| 7,150,535 B2* | 12/2006 | Akiyama | 353/38 |
| RE39,702 E | 6/2007 | Hashizume et al. | |
| 7,690,793 B2* | 4/2010 | Kodama et al. | 353/20 |
| RE41,680 E | 9/2010 | Hashizume et al. | |
| 7,963,657 B2* | 6/2011 | Amano et al. | 353/20 |
| 7,993,007 B2* | 8/2011 | Fuse et al. | 353/38 |
| 8,123,366 B2* | 2/2012 | Akiyama | 353/98 |
| 8,297,760 B2* | 10/2012 | Aragaki et al. | 353/101 |
| 8,562,152 B2* | 10/2013 | Akiyama | 353/94 |
| 2002/0060780 A1* | 5/2002 | Takezawa et al. | 353/53 |
| 2005/0157268 A1* | 7/2005 | Akiyama | 353/38 |
| 2009/0244493 A1* | 10/2009 | Aragaki et al. | 353/69 |
| 2010/0208214 A1* | 8/2010 | Kawamura et al. | 353/38 |
| 2011/0085143 A1* | 4/2011 | Aruga | 353/31 |
| 2012/0133904 A1* | 5/2012 | Akiyama | 353/38 |
| 2012/0212708 A1* | 8/2012 | Kimura | 353/38 |

* cited by examiner

PROJECTOR HAVING INTEGRATOR WITH GREATER ILLUMINANCE IN OFFSET DIRECTION OF PROJECTION LENS AND MODULATOR

BACKGROUND

1. Technical Field

The present invention relates to a projector.

2. Related Art

In a technical field of projectors, there is a widely known projector including an illuminator that outputs light, a lens integrator system that makes the light from the illuminator uniform, a light modulator that modulates the light from the lens integrator system in accordance with image information, and a projection system that projects the light from the light modulator (see JP-A-10-115803, for example). According to a projector of this type, the uniform light from the lens integrator system can be incident on an image formation region of the light modulator.

In the technical field of projectors, design that allows the following situation has been studied: a projector is installed in parallel to the ground and a projection image is projected in a position that does not directly face the front side of the projector (upward position when projector is placed on horizontal surface, downward position when projector is hung from ceiling). As a projector designed to allow the situation described above, there is a known projector of related art in which the projection system is so disposed that the optical axis of light incident on the projection system is shifted from the optical axis of the projection system in a predetermined direction (downward when projector is placed on horizontal surface, upward when projector is hung from ceiling) when the projection system is viewed in the direction in which light travels toward the projection system (see FIG. 2, which will be described later). The configuration described above allows a projection image to be projected on the side opposite the predetermined direction even with the projector installed in parallel to the ground.

The projector of the related art is, however, problematic in that the difference between the manner in which light passes through a central portion of the projection system (portion in the vicinity of optical axis) and the manner in which light passes through the periphery of the projection system produces a dim portion on the side opposite the predetermined direction (upper side when projector is placed on horizontal surface, lower side when projector is hung from ceiling) when a projection image is projected and hence causes non-uniform brightness of the projected image. The problem worsens in the case of a so-called proximity projection projector, which is a projector that projects a projection image on a nearby projection object and hence the optical axis of the light incident on the projection system is greatly shifted from the optical axis of the projection system. As a simple method for solving the problem described above, it is conceivable, for example, to adjust the brightness in the image formation region of the light modulator on a small-area basis. Using the method described above, however, reduces the amount of light incident on the bright portion of the image formation region to the brightness of the dim portion thereof, disadvantageously resulting in a difficulty in increasing light usage efficiency.

SUMMARY

An advantage of some aspects of the invention is to provide a projector capable of making the brightness of a projection image uniform and increasing light usage efficiency.

The inventor of the invention has intensively conducted studies and come up with an idea that light may be incident on an image formation region of a light modulator in such a way that a projected image has uniform brightness. That is, the inventor has found that changing the distribution of the light (illuminance distribution) incident on the image formation region by using a lens integrator system allows not only the brightness of a projected image to be uniform but also the light usage efficiency to be increased. The invention has been made based on the finding described above and includes the following configurations.

[1] A projector according to one aspect of the invention includes a light source unit that outputs light, a lens integrator system, a light modulator having an image formation region where light from the lens integrator system is modulated in accordance with image information, and a projection system that projects light from the light modulator. The projection system is so disposed that the optical axis of the light incident on the projection system is shifted from the optical axis of the projection system in a predetermined direction when the projection system is viewed in the direction in which the light travels toward the projection system, and the lens integrator system is so configured that illuminance of the light on a first side corresponding to the predetermined direction in the image formation region is higher than illuminance of the light on a second side that is opposite the side corresponding to the predetermined direction in the image formation region.

According to the projector of the aspect of the invention, since the lens integrator system is so configured that the illuminance of the light on the first side in the image formation region is higher than the illuminance of the light on the second side in the image formation region, a projected image has uniform brightness. Further, since the lens integrator system is not so configured that the amount of light is reduced to make the brightness uniform, the brightness of the projected image can be maintained. It is also not necessary to reduce the amount of light in a bright portion of the image formation region to the brightness in a dim portion thereof. As a result, the projector according to the aspect of the invention is capable of making the brightness of a projected image uniform and increasing the light usage efficiency.

Further, according to the projector of the aspect of the invention, since the projection system is so disposed that the optical axis of the light incident on the projection system is shifted from the optical axis of the projection system in a predetermined direction, the projector can project a projection image on the side opposite the predetermined direction even when the projector is installed in parallel to the ground, as in a projector of related art.

The reason why the lens integrator system is so configured that the illuminance of the light on the first side in the image formation region is higher than the illuminance of the light on the second side in the image formation region is to allow the projection system to project an inverted image of an image formed on the image formation region on a projection object (screen, for example).

[2] In the projector according to the aspect of the invention, it is preferable that the lens integrator system is so configured that the illuminance in the image formation region gradually increases in a direction from the second side toward the first side in the image formation region.

Since light that exits from a position closer to the first side passes through a portion closer to the end of the projection system, the configuration described above allows the brightness to be gradually complimented toward the first side, whereby the brightness of a projected image can be made more uniform.

[3] In the projector according to the aspect of the invention, it is preferable that the lens integrator system includes a first lens array having a plurality of first lenslets and a second lens array having a plurality of second lenslets corresponding to the plurality of first lenslets, and the first lenslets and the second lenslets are preferably so shaped that the illuminance of the light on the first side in the image formation region is higher than the illuminance of the light on the second side in the image formation region.

In the configuration described above, adjusting the light distribution by using the first lens array and the second lens array in the lens integrator system can not only make the brightness of a projected image uniform with no increase in the number of components of the projector but also increase the light usage efficiency.

[4] In the projector according to the aspect of the invention, it is preferable that, in the first lens array, when portions in the vicinity of both ends corresponding to the first side and the second side are denoted as peripheral portions and a portion between the peripheral portions is denoted as a central portion, in the first lens array, the front-view area of each of the first lenslets in the central portion is large, and that the front-view area of each of the first lenslets in the peripheral portions is small.

Since a typical illuminator outputs light having a circular illumination range, the central portion of the first lens array processes a greater amount of light, whereas the peripheral portions process a less amount of light. In the configuration described above, fine adjustment can be made on the light distribution primarily by using the light incident on the peripheral portions, and hence the brightness of a projected image can be readily made uniform.

In the case described above, it is preferable also in the second lens array that the front-view area of each of the second lenslets in the central portion is large and the front-view area of each of the second lenslets in the peripheral portions is small in correspondence with the first lens array.

[5] In the projector according to the aspect of the invention, it is preferable that, in the first lens array, the front-view area of the first lenslets in the peripheral portions becomes gradually smaller when the first lenslets are closer to the ends.

In the configuration described above, fine adjustment can be more readily made on the light distribution by using the light incident on the peripheral portions, and hence the brightness of a projected image can be more readily made uniform.

In the case described above, it is preferable also in the second lens array that the front-view area of the second lenslets in the peripheral portions becomes gradually smaller when the second lenslets are closer to the ends in correspondence with the first lens array.

[6] It is preferable that the projector according to the aspect of the invention is a proximity projection projector.

In a proximity projection projector, the problem of a dim portion on the side opposite the predetermined direction (upper side when projector is placed on horizontal surface, lower side when projector is hung from ceiling) produced when a projection image is projected and hence non-uniform brightness of the projected image tends to be worse, as described above. The invention is therefore preferably applicable to a proximity projection projector.

[7] In the projector according to the aspect of the invention, it is preferable that the light modulators is formed of a liquid-crystal-type light modulator.

The invention is preferably applicable to a projector including a liquid-crystal-type light modulator accompanied by a lens integrator system in many cases.

[8] In the projector according to the aspect of the invention, it is preferable that the light modulator is a micromirror-type light modulator.

The invention is also preferably applicable to a projector including a micromirror-type light modulator as long as the projector uses a lens integrator system.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to an embodiment of the invention will be described with reference to the drawings.

Embodiment

Figure 1:
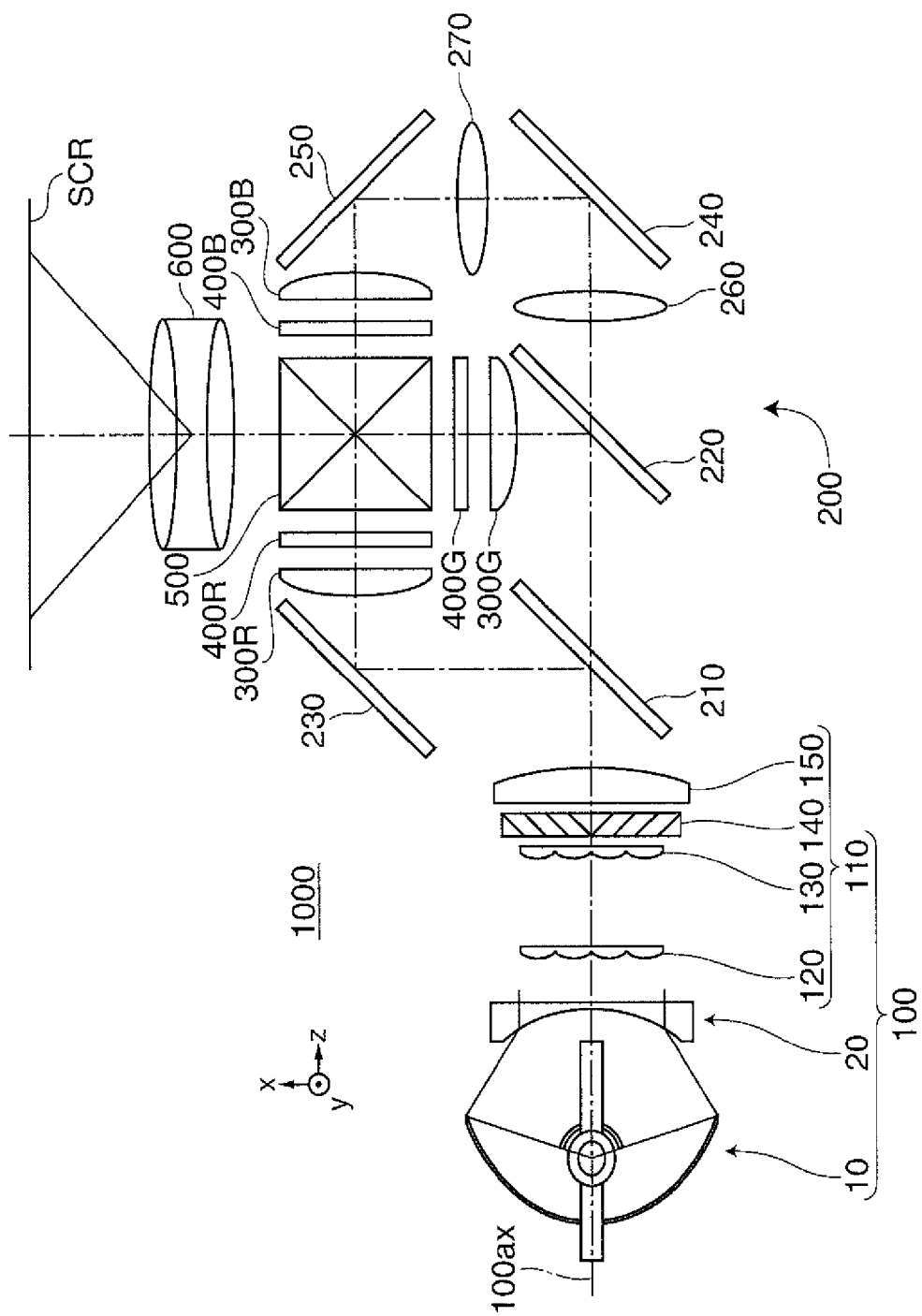
FIG. 1 is a top view showing an optical system of a projector according to an embodiment.

FIG. 1 is a top view showing an optical system of a projector 1000 according to the embodiment.

Figure 2:
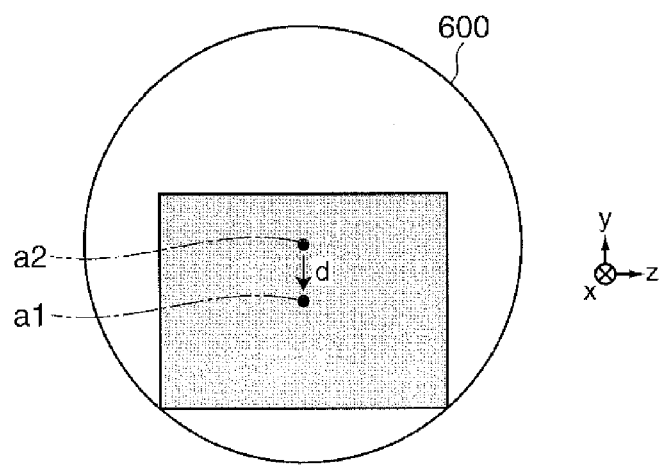
FIG. 2 describes the relationship between a projection system in the embodiment and light incident on the projection system.

FIG. 2 describes the relationship between a projection system 600 in the embodiment and light incident on the projection system 600. In FIG. 2, reference character a1 denotes the optical axis of the projection system 600, reference character a2 denotes the optical axis of the light incident on the projection system 600, and reference character d denotes a predetermined direction. The gray rectangle schematically represents the light incident on the projection system 600.

Figures 3A, 3B:
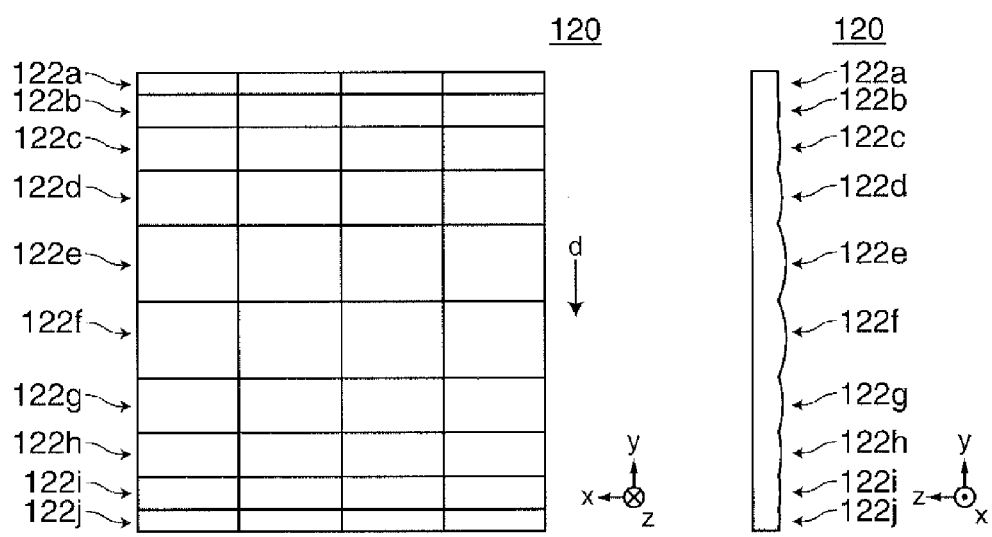
FIGS. 3A and 3B describe a first lens array in the embodiment.

FIGS. 3A and 3B describe a first lens array 120 in the embodiment. FIG. 3A is a front view of the first lens array 120, and FIG. 3B is a side view of the first lens array 120. Reference character 122a denotes a row of first lenslets 122a, and so do reference characters 122b to 122j.

Figure 4:
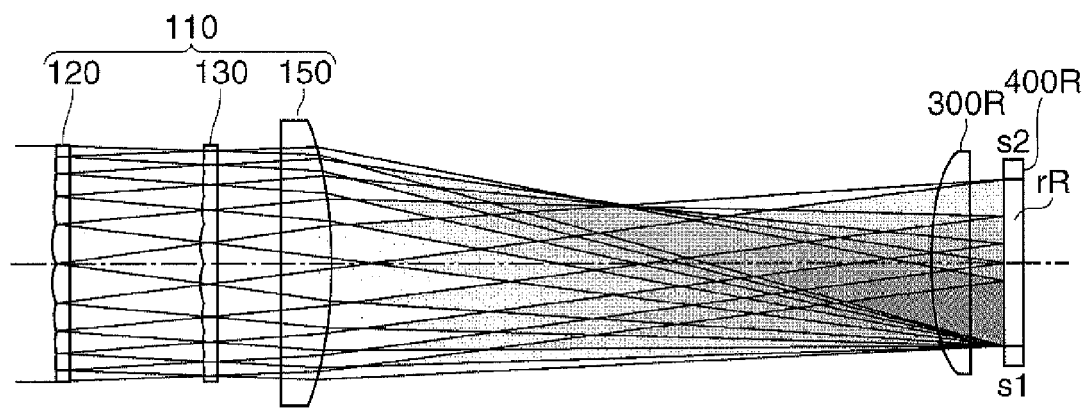
FIG. 4 describes how a lens integrator system in the embodiment works.

FIG. 4 describes how a lens integrator system 110 in the embodiment works.

In FIG. 4, only a light modulator 400R is shown as a light modulator. Light modulators 400G and 400B are omitted in FIG. 4 because they work in the same manner as the light modulator 400R except the color light fluxes they handle (the same holds true for FIG. 7, which will be described later).

Further, a polarization conversion element 140 in the lens integrator system 110 is also omitted in FIG. 4 for ease of description. From the same reason, optical elements between the lens integrator system 110 and the light modulator 400R are omitted in FIG. 4, and the lens integrator system 110, a light collector lens 300R, and the light modulator 400R are arranged along a straight line and shown in FIG. 4. In FIG. 4, purer black represents that a greater number of light rays are present (greater magnitude of illuminance) (the same holds true for FIG. 7, which will be described later).

Moreover, in FIG. 4, the side indicated by s1 is a first side, and the side indicated by s2 is a second side (the same holds true for FIG. 7, which will be described later).

Figure 5A:
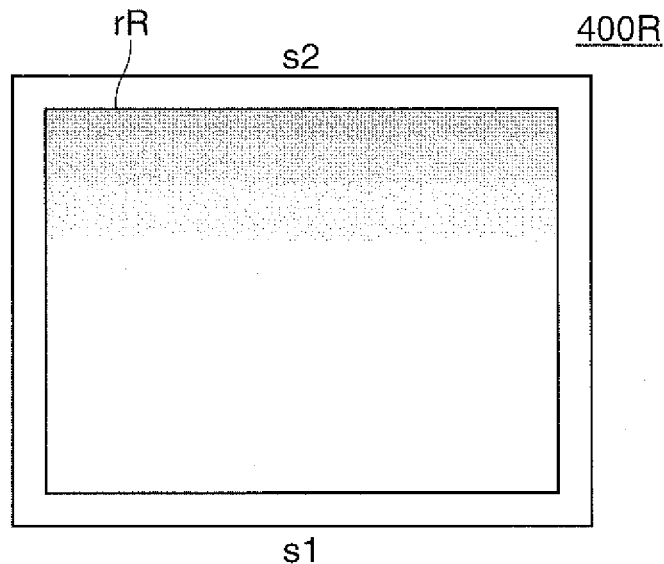
FIGS. 5A and 5B are schematic views showing the distributions of light incident on a light modulator and a screen in the embodiment.
Figure 5B:
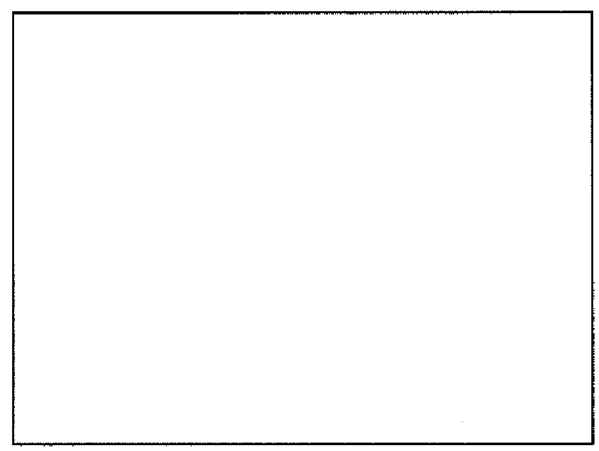

FIGS. 5A and 5B are schematic views showing the distributions of light incident on the light modulator 400R and a screen SCR in the embodiment. FIG. 5A is a schematic view showing the distribution of light incident on an image formation region rR of the light modulator 400R, and FIG. 5B is a schematic view showing the distribution of light incident on the screen SCR.

In FIGS. 5A and 5B, purer white represents a greater magnitude of illuminance (than other portions). An entirely white region represents that light is incident uniformly on the region (the same holds true for FIGS. 8A and 8B, which will be described later).

Further, FIG. 5A only shows the light distribution in the image formation region rR (the same holds true for FIG. 8A, which will be described later).

In the drawings, three directions perpendicular to one other are called a z-axis direction (direction of optical axis of illuminator 100 (illumination optical axis 100ax) in FIG. 1), an x-axis direction (direction parallel to plane of view in FIG. 1 and perpendicular to z axis), and a y-axis direction (direction perpendicular to plane of view in FIG. 1 and perpendicular to z axis).

The projector 1000 according to the embodiment includes an illuminator 100, a color separation/light guiding system 200, light collector lenses 300R, 300G, and 300B, light modulators 400R, 400G, and 400B, a cross dichroic prism 500, and a projection system 600, as shown in FIG. 1. In the projector 1000, the projection system 600 is so disposed that the optical axis a1 of light incident on the projection system 600 is shifted from the optical axis a2 of the projection system 600 in the predetermined direction d when the projection system 600 is viewed in the direction in which the light travels toward the projection system 600, as shown in FIG. 2. The optical axis a2 of the projection system 600 is the optical axis of the entire projection system 600 formed of a compound lens.

The illuminator 100 includes a light source unit 10, a light parallelizing system 20, and a lens integrator system 110.

The illuminator 100 outputs, along the illumination optical axis 100ax, light containing red light, green light, and blue light (that is, light usable as white light) and having a single aligned polarization direction as illumination light. An illuminator that outputs light having various polarization directions may alternatively be used.

The light source unit 10 outputs convergent light centered around the illumination optical axis 100ax toward a region to be illuminated. The light source unit 10 can include a metal halide lamp, a high-pressure mercury lamp, an ultra-high-pressure mercury lamp, or any other arc tube that emits high-intensity light. The light source unit 10 can alternatively include, for example, a light emitting diode (LED), a semiconductor laser (LD), or an organic EL (OLED).

The light parallelizing system 20 substantially parallelizes the light from the light source unit 10 and outputs the substantially parallelized light. The light parallelizing system 20 is formed, for example, of a concave lens. The light parallelizing system may alternatively be a compound lens that is a combination of a plurality of lenses.

The lens integrator system 110 includes a first lens array 120, a second lens array 130, a polarization conversion element 140, and a superimposing lens 150. The lens integrator system 110 is so configured that the illuminance of light on the first side s1, which corresponds to the predetermined direction d, in an image formation region rR of the light modulator 400R, an image formation region rG (not shown) of the light modulator 400G, and an image formation region rB (not shown) of the light modulator 4003 is higher than the illuminance of light on the second side s2, which is opposite the side corresponding to the predetermined direction d, in the image formation regions rR, rG, and rB. The lens integrator system 110 is further so configured that the illuminance in each of the image formation regions gradually increases in the direction from the second side s2 toward the first side s1 (see FIG. 4 and FIG. 5A).

The situation in which the illuminance of the light on the first side s1 is higher than the illuminance of the light on the second side s2 can be achieved by appropriately setting the shape, the light exiting direction, the curvature, the refractive index, and other factors of each of the individual lenslets that form the first lens array 120 and the second lens array 130. One of the factors to be set will be described below.

The first lens array 120 has a plurality of first lenslets 122a to 122j, as shown in FIGS. 3A and 313, which divide the light having exited through the concave lens 20 into a plurality of partial light fluxes. In the first lens array 120, call portions in the vicinity of both ends corresponding to the first side s1 and the second side s2 (upper and lower ends in FIGS. 3A and 3B) peripheral portions, and call the portion between the peripheral portions a central portion. In the first lens array 120, the front-view area of each of the first lenslets 122e and 122f in the central portion is large, and the front-view area of each of the first lenslets 122a to 122d and 122g to 122j in the peripheral portions is small. Further, in the first lens array 120, the front-view area of the first lenslets 122a to 122d and 122g to 122j in the peripheral portions becomes gradually smaller when the first lenslets are closer to the ends.

Each of the first lenslets 122e and 122f in the central portion has a shape corresponding to the image formation regions rR, rG, and rB of the light modulators 400R, 400G, and 400B and causes light to be incident on the entire image formation regions rR, rG, and rB, as shown in FIG. 4.

Each of the first lenslets 122a to 122d and 122g to 122j in the peripheral portions has a horizontally elongated shape as compared with the shape of the image formation regions rR, rG, and rB and causes light to be incident on part of the image formation regions rR, rG, and rB on the first side s1 (portions close to first side s1).

That is, the light that each of the first lenslets 122a to 122d and 122g to 122j in the peripheral portions causes to be incident on the image formation regions rR, rG, and rB has a horizontally elongated shape, and the horizontally elongated light is collected on the first side s1 by appropriately setting the direction in which the light exits through the first lenslets 122a to 122d and 122g to 122j, whereby the illuminance of the light on the first side s1 in the image formation regions rR, rG, and rB is increased.

The first lens array 120 in the embodiment has been described with reference to the case where eight first lenslets are disposed in the central portion and 32 first lenslets are disposed in the peripheral portions, but the invention is not necessarily configured this way. The number and shape of first lenslets in each of the central and peripheral portions can be arbitrarily set in accordance with the size of the first lens array and the shape of the image formation regions (aspect ratio, in particular). The same holds true for the second lens array.

The second lens array 130, the front view or reference characters of which are omitted, has a plurality of second lenslets 132a to 132j corresponding to the plurality of first lenslets 122a to 122j in the first lens array 120. The front-view shape of the second lens array 130 is substantially the same as that of the first lens array 120.

Each of the first lenslets 122a to 122j and the second lenslets 132a to 132j is so shaped that the illuminance of the light on the first side s1 in the image formation regions rR, rG, and rB is higher than the illuminance of the light on the second side s2 in the image formation regions rR, rG, and rB, as shown in FIG. 4.

The polarization conversion element 140 converts the divided partial light fluxes from the first lens array 120 into substantially one type of linearly polarized light having a single aligned polarization direction (S-polarized light, for example) and outputs the linearly polarized light.

The polarization conversion element 140 includes a polarization separation layer that transmits one of the linearly polarized light components contained in the light from the light source unit 10 and reflects other of the linearly polarized light components in a direction perpendicular to the illumination optical axis 100ax, a reflection layer that reflects the other linearly polarized light component reflected off the polarization separation layer in the direction parallel to the illumination optical axis 100ax, and a wave plate that changes the one linearly polarized light component having passed through the polarization separation layer to the other linearly polarized light component.

The superimposing lens 150 is an optical element that collects the partial light fluxes from the polarization conversion element 140 and superimposes them in the vicinity of each of the image formation regions rR, rG, and rB of the light modulators 400R, 400G, and 400B. The superimposing lens 150 may alternatively be formed of a compound lens that is a combination of a plurality of lenses.

The color separation/light guiding system 200 has a function of separating the light from the illuminator 100 into red light, green light, and blue light and guiding the red light, the green light, and the blue light to the respective light modulators 400R, 400G, and 400B, which are objects to be illuminated.

The color separation/light guiding system 200 includes dichroic mirrors 210 and 220, reflection mirrors 230, 240, and 250, and relay lenses 260 and 270.

The dichroic mirrors, the reflection mirrors, and the relay lenses themselves each have a widely known configuration, and no description thereof will therefore be made.

The dichroic mirror 210 reflects the red light component and transmits the green and blue light components.

The dichroic mirror 220 reflects the green light component and transmits the blue light component.

The red light reflected off the dichroic mirror 210 is further reflected off the reflection mirror 230, passes through the collector lens 300R, and reaches the light modulator 400R.

The green light having passed, along with the blue light, through the dichroic mirror 210 is reflected off the dichroic mirror 220, passes through the collector lens 300G, and reaches the light modulator 400G.

The blue light having passed through the dichroic mirror 220 travels along the relay lens 260, the reflection mirror 240, the relay lens 270, the reflection mirror 250, and the collector lens 300B and reaches the light modulator 400B. The relay lenses 260 and 270 and the reflection mirrors 240 and 250 have a function of guiding the blue light component having passed through the dichroic mirror 220.

The reason why the relay lenses 260 and 270 are provided in the optical path of the blue light is to prevent the light usage efficiency from decreasing due, for example, to light convergence because the optical path of the blue light flux has a length longer than those of the optical paths of the other color light fluxes. In the projector 1000 according to the embodiment, the configuration described above is employed because the optical path of the blue light has a longer length, but it is conceivable to employ another configuration in which, for example, the optical path of the red light has a longer length and the relay lenses and the reflection mirrors are disposed in the optical path of the red light.

The light collector lenses 300R, 300G, and 3002 are disposed at locations downstream of the color separation/light guiding system 200 and cause the color light fluxes to be incident on the corresponding image formation regions rR, rG, and rB of the light modulators 400R, 400G, and 400B.

Each of the light modulators 400R, 400G, and 400B is a liquid-crystal-type light modulator that seals and encapsulates a liquid crystal material, which is an electro-optic material, between a pair of transparent glass substrates. The image formation regions rR, rG, and rB of the light modulators 400R, 400G, and 400B modulate light having traveled along the lens integrator system 110 and the color separation/light guiding system 200 and passed through the light collector lenses 300R, 300G, and 300B in accordance with image information. Each of the light modulators 400R, 400G, and 400B is a so-called transmissive light modulator. Each of the image formation regions rR, rG, and rB, for example, uses a polysilicon TFT as a switching device to modulate the polarization direction of the light incident thereon in accordance with a provided image signal. Although not shown or described in detail, a light-incident-side polarizer and a light-exiting-side polarizer are provided on the light-incident side and the light-exiting side of each of the light modulators 400R, 400G, and 400B, and the polarizers along with the light modulators 400R, 400G, and 400B form a projection image.

In the image formation regions rR, rG, and rB of the light modulators 400R, 400G, and 400B, the illuminance of the light on the first side s1 is higher than the illuminance of the light on the second side s2, as shown in FIG. 5A.

The cross dichroic prism 500 is an element that combines the light fluxes from the light modulators 400R, 400G, and 400B and aligns the directions in which the light fluxes travel with each other. The cross dichroic prism 500 is formed, for example, by bonding four rectangular prisms and thus has a substantially square shape in a plan view. Dielectric multilayer films are formed along the substantially X-shaped interfaces between the bonded rectangular prisms. The dielectric multilayer film formed on one of the substantially X-shaped interfaces reflects the red light, whereas the dielectric multilayer film formed on the other interface reflects the blue light. The dielectric multilayer films deflect the red light and the blue light, which then travel in the same direction as the green light, and the three color light fluxes are thus combined.

The light from the cross dichroic prism 500 is projected through the projection system 600 and forms a projection image on the screen SCR, which is a projection object.

The configuration of the projection system 600 is well known, and no detailed description thereof will therefore be made.

The light is incident on the screen SCR in a uniformly balanced manner, and uniform brightness is achieved over the screen SCR, as shown in FIG. 5B.

An advantageous effect provided by the projector 1000 according to the embodiment will be described below.

According to the projector 1000 of the embodiment, since the lens integrator system 110 is so configured that the illuminance of the light on the first side s1 in the image formation regions rR, rG, and rB is higher than the illuminance of the light on the second side s2 in the image formation regions rR, rG, and rB, a projected image has uniform brightness. Further, since the lens integrator system 110 is not so configured that the amount of light is reduced to make the brightness uniform, the brightness of the projected image can be maintained. It is also not necessary to reduce the amount of light in bright portions of the image formation regions to the brightness in dim portions thereof. As a result, the projector 1000 according to the embodiment is capable of making the brightness of a projected image uniform and increasing the light usage efficiency.

Further, according to the projector 1000 of the embodiment, since the projection system 600 is so disposed that the optical axis a1 of the light incident on the projection system 600 is shifted from the optical axis a2 of the projection system 600 in the predetermined direction d when the projection system 600 is viewed in the direction in which the light travels toward the projection system 600, the projector 1000 can project a projection image on the side opposite the predetermined direction even when the projector 1000 is installed in parallel to the ground, as in a projector of related art.

Moreover, according to the projector 1000 of the embodiment, since the lens integrator system 110 is so configured that the illuminance in the image formation regions rR, rG, and rB gradually increases in the direction from the second side s2 toward the first side s1, the brightness is gradually complimented toward the first side s1, and the brightness of a projection image can be made more uniform.

Further, according to the projector 1000 of the embodiment, since the lens integrator system 110 includes the first lens array 120 and the second lens array 130, and the first lenslets 122a to 122j and the second lenslets 132a to 132j are so shaped that the illuminance of the light on the first side s1 in the image formation regions rR, rG, and rB is higher than the illuminance of the light on the second side s2 in the image formation regions rR, rG, and rB, adjusting the light distribution by using the first lens array and the second lens array in the lens integrator system can not only make the brightness of a projection image uniform with no increase in the number of components of the projector but also increase the light usage efficiency.

Further, according to the projector 1000 of the embodiment, since, in the first lens array 120, the front-view area of each of the first lenslets 122e and 122f in the central portion is large, and the front-view area of each of the first lenslets 122a to 122d and 122g to 122j in the peripheral portions is small, fine adjustment can be made on the light distribution primarily by using the light incident on the peripheral portions, and hence the brightness of a projection image can be readily made uniform.

Further, according to the projector 1000 of the embodiment, since the front-view area of the first lenslets 122a to 122d and 122g to 122j in the peripheral portions in the first lens array 120 becomes gradually smaller when the first lenslets are closer to the ends, fine adjustment can be more readily made on the light distribution by using the light incident on the peripheral portions, and hence the brightness of a projection image can be more readily made uniform.

The invention is preferably applicable to the projector 1000 including the light modulators 400R, 400G, and 400B, each of which is a liquid-crystal-type light modulator accompanied by a lens integrator system in many cases.

Comparative Example

Figures 6A, 6B:
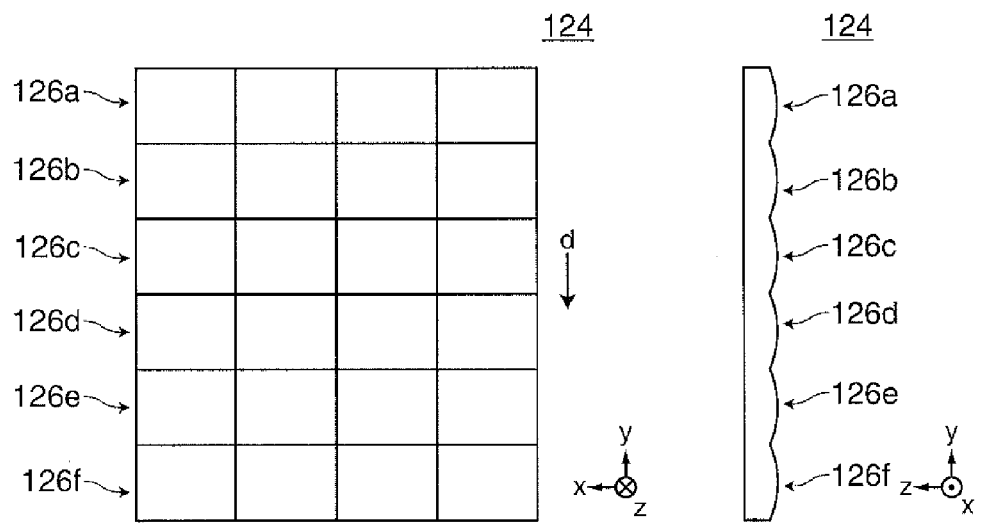
FIGS. 6A and 6B describe a first lens array in Comparative Example.

FIGS. 6A and 6B describe a first lens array 124 in Comparative Example. FIG. 6A is a front view of the first lens array 124, and FIG. 6B is a side view of the first lens array 124. Reference character 126a denotes a row of first lenslets 126a, and so do reference characters 126b to 126f.

Figure 7:
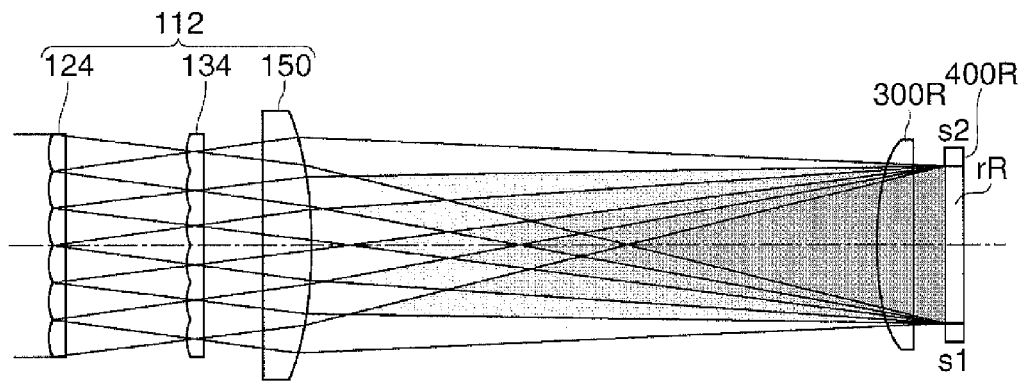
FIG. 7 describes how a lens integrator system in Comparative Example works.

FIG. 7 describes how a lens integrator system 112 in Comparative Example works.

Figure 8A:
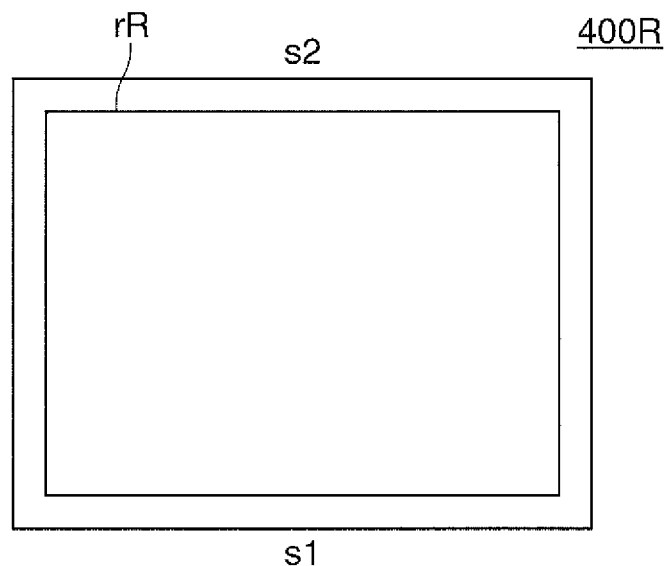
FIGS. 8A and 8B are schematic views showing the distribution of light incident on the light modulator and the screen in Comparative Example.
Figure 8B:
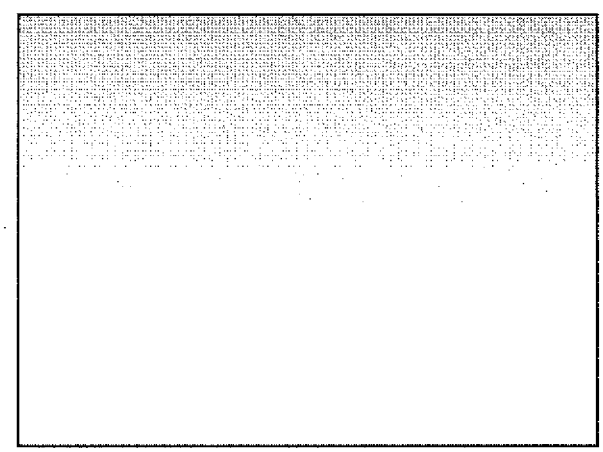

FIGS. 8A and 8B are schematic views showing the distribution of light incident on the light modulator 400R and the screen SCR in Comparative Example. FIG. 8A is a schematic view showing the distribution of the light incident on the image formation region rR of the light modulator 400R, and FIG. 8B is a schematic view showing the distribution of the light incident on the screen SCR.

Comparative Example describes a projector 1002 according to Comparative Example having the same configuration as that of a projector of related art and confirms the advantageous effect provided by the invention.

The projector 1002 according to Comparative Example basically has the same configuration as that of the projector 1000 according to the embodiment but differs therefrom in terms of the configuration of the lens integrator system. That is, in the projector 1002 according to Comparative Example, the lens integrator system 112 is so configured that uniform light is incident on the image formation regions rR, rG, and rB.

The lens integrator system 112 includes a first lens array 124 having a plurality of first lenslets 126a to 126f, a second lens array 134 having a plurality of second lenslets 136a to 136f corresponding to the plurality of first lenslets 126a to 126f, a polarization conversion element 140 (not shown), and a superimposing lens 150, as shown in FIG. 7. Among the components described above, the polarization conversion element 140 has the same configuration as that of the polarization conversion element 140 in the embodiment, and the superimposing lens 150 has the same configuration as that of the superimposing lens 150 in the embodiment. No description of the polarization conversion element 140 and the superimposing lens 150 in the lens integrator system 112 will therefore be made.

The first lenslets 126a to 126f in the first lens array 124 have the same shape, as shown in FIGS. 6A and 6B. Specifically, the first lenslets 126a to 126f have a shape corresponding to the image formation regions rR, rG, and rB of the light modulators 400R, 400G, and 400B and cause light to be incident on the entire image formation regions rR, rG, and rB, as shown in FIGS. 7 and 8A.

The second lens array 134, the front view or reference characters of which are omitted, has a plurality of second lenslets 136a to 136f corresponding to the plurality of first lenslets 126a to 126l in the first lens array 124.

In the projector 1002, which includes the lens integrator system 112 having the configuration described above, light having a uniform distribution is incident on the image formation regions rR, rG, and rB, as shown in FIG. 8A.

In the projector 1002, the projection system 600 is so disposed that the optical axis of light incident on the projection system is shifted from the optical axis of the projection system in a predetermined direction d (downward in this case) when the projection system is viewed in the direction in which the light travels toward the projection system, as in the projector 1000. As a result, in the projector 1002 according to Comparative Example, the difference between the manner in which light passes through a central portion of the projection system 600 (portion in the vicinity of optical axis) and the manner in which light passes through the periphery of the projection system 600 produces a dim portion on the side opposite the predetermined direction (upper side in this case) when a projection image is projected and hence causes non-uniform brightness of the projected image (see FIG. 8B).

Comparison between the projector 1000 according to the embodiment described above and the projector 1002 according to Comparative Example clearly shows the advantageous effect provided by the projector according to the embodiment of the invention. That is, in the projector according to the embodiment of the invention, the lens integrator system is so configured that the illuminance of the light on the first side in the image formation regions is higher than the illuminance of the light on the second side in the image formation regions, whereby a projected image has uniform brightness. Further, since the lens integrator system is not so configured that the amount of light is reduced to make the brightness uniform, the brightness of the projected image can be maintained. It is also not necessary to reduce the amount of light in bright portions of the image formation regions to the brightness in dim portions thereof. As a result, the projector according to the embodiment of the invention is capable of making the brightness of a projected image uniform and increasing the light usage efficiency.

The invention has been described based on the embodiment described above, but the invention is not limited thereto. The invention can be implemented in a variety of aspects to the extent that they do not depart from the substance of the invention. For example, the following variations are conceivable.

(1) The dimension, number, material, and shape of each of the components described in the above embodiment are presented by way of example and can be changed to the extent that the changes do not compromise the advantageous effect of the invention.

(2) The projector according to the embodiment of the invention is preferably a proximity projection projector. In a proximity projection projector, the problem of a dim portion on the side opposite a predetermined direction (upper side when projector is placed on horizontal surface, lower side when projector is hung from ceiling) produced when a projection image is projected and hence non-uniform brightness of the projected image tends to be worse. The invention is therefore preferably applicable to a proximity projection projector.

(3) In the embodiment described above, each of the light modulators is formed of a liquid-crystal-type light modulator, but the invention is not necessarily configured this way. For example, a light modulator formed of a micromirror-type light modulator may alternatively be used. The invention is also preferably applicable to a projector including a micromirror-type light modulator as long as the projector uses a lens integrator system.

(4) The invention is applicable not only to a front projection projector that projects a projection image from the observation side but also to a rear projection projector that projects a projection image from the side opposite the observation side.

The entire disclosure of Japanese Patent Application No. 2012-090849, filed Apr. 12, 2012 is expressly incorporated by reference herein.

What is claimed is:

1. A projector comprising:
a light source unit that outputs light;
a lens integrator system;
a light modulator having an image formation region where light from the lens integrator system is modulated in accordance with image information; and
a projection system that projects light from the light modulator,
wherein the projection system is so disposed that the optical axis of the light incident on the projection system is shifted from the optical axis of the projection system in a predetermined direction when the projection system is viewed in the direction in which the light travels toward the projection system, and
the lens integrator system is so configured that illuminance of the light on a first side corresponding to the predetermined direction in the image formation region is higher than illuminance of the light on a second side that is opposite the side corresponding to the predetermined direction in the image formation region.

2. The projector according to claim 1,
wherein the lens integrator system is so configured that the illuminance in the image formation region gradually increases in a direction from the second side toward the first side in the image formation region.

3. The projector according to claim 1,
wherein the lens integrator system includes a first lens array having a plurality of first lenslets and a second lens array having a plurality of second lenslets corresponding to the plurality of first lenslets, and
the first lenslets and the second lenslets are so shaped that the illuminance of the light on the first side in the image formation region is higher than the illuminance of the light on the second side in the image formation region.

4. The projector according to claim 3,
wherein in the first lens array, when portions in the vicinity of both ends corresponding to the first side and the second side are denoted as peripheral portions and a portion between the peripheral portions is denoted as a central portion, in the first lens array, the front-view area of each of the first lenslets in the central portion is large, and the front-view area of each of the first lenslets in the peripheral portions is small.

5. The projector according to claim 4,
wherein in the first lens array, the front-view area of the first lenslets in the peripheral portions becomes gradually smaller when the first lenslets are closer to the ends.

6. The projector according to claim 1,
wherein the projector is a proximity projection projector.

7. The projector according to claim 1,
wherein the light modulators is formed of a liquid-crystal light modulator.

8. The projector according to claim 1,
wherein the light modulator is a micromirror light modulator.